United States Patent Office 2,869,757
Patented Jan. 20, 1959

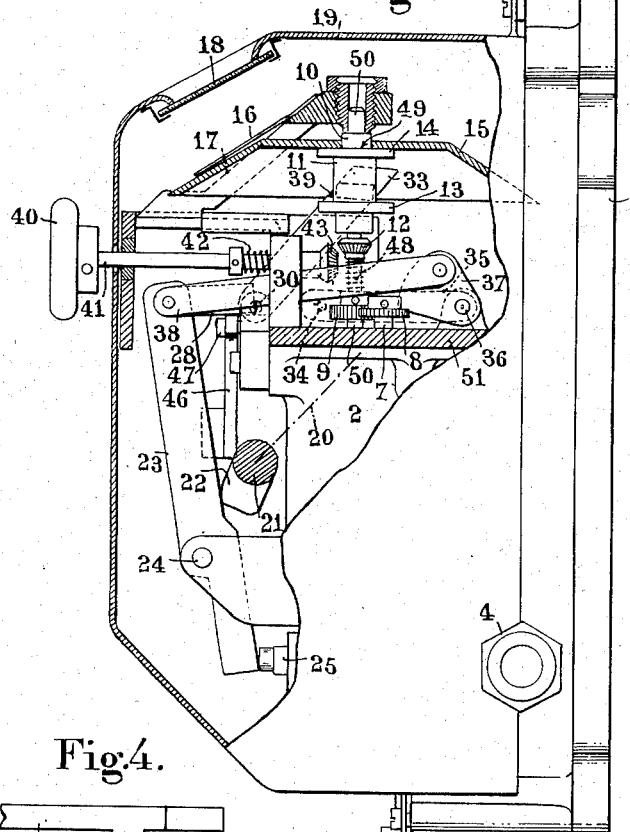
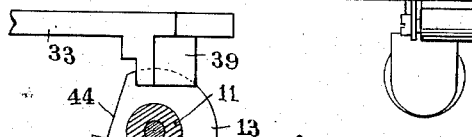
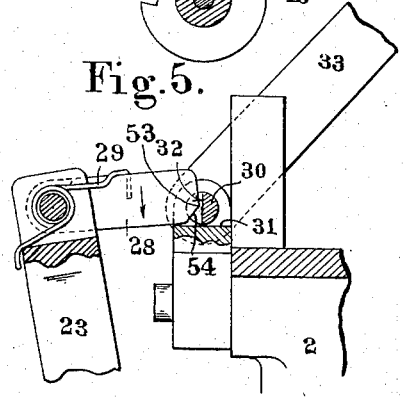

2,869,757
LIQUID METERING APPARATUS

Yves Luce, Montreuil-sous-Bois, France

Application December 10, 1956, Serial No. 627,335

Claims priority, application France December 19, 1955

4 Claims. (Cl. 222—14)

The present invention relates to a liquid metering apparatus intended more particularly for use in bread-, pastry-, biscuit- and rusk-making, but also adapted for use in very different fields, this device being simple and sturdy in construction and convenient and safe in operation, and utilizing a conventional-type metering device of which the operation is not impaired by any parasitical resistance and does not require any external source of power except the force of the springs controlling the closing of the hot-water and cold-water inlet valves.

To this end and according to the present invention the lever whereby the valve springs may be compressed is held in its operative position by a catch engaging the flat portion of a pivoting shaft rigid with an arm provided with a shoe bearing freely on a disc rotating bodily with the meter shaft, this disc having formed therein a notch adapted to release the aforesaid shoe and to permit the pivoting movement of the arm and also of the shaft rigid therewith so as to release the catch of the valve-controlling lever which may thus escape from the flat portion of said pivoting shaft for a predetermined angular position of said disc which corresponds to a predetermined output, the initial angular position of said disc being adapted to be set beforehand; to this end, the apparatus may be provided with a dial rotatably fast with said disc and adapted to move in front of a pointer and behind a window provided in the housing of the apparatus, this disc being subsequently driven for rotation about the meter shaft to an extent proportionate to the quantity of liquid fed by the apparatus.

Each time the apparatus has been used it may be reset or re-cocked and to this end the apparatus may be provided with another pivoting arm comprising a pin positioned under the aforesaid arm and tending to restore same to its upper position above the disc through a bellcrank lever system responsive to the action of the valve springs when the valves are closed, said other arm being retracted downwards so as to avoid any interference with the pivoting movement of said first arm when the valve springs are compressed and the valves proper locked in their open position.

In order to afford a clearer understanding of the present invention and of the manner in which the same may be carried out in the practice, reference will now be made to the attached drawings forming part of this specification and illustrating diagrammatically by way of example a typical embodiment of the invention. In the drawings:

Figure 3 is a view similar to Fig. 2 but showing the parts in their operative positions.

Figure 4 is a plane view showing a detail on a larger scale, and

Figures 5 and 6 are side views showing another detail in two different positions of the parts concerned.

Figure 1:
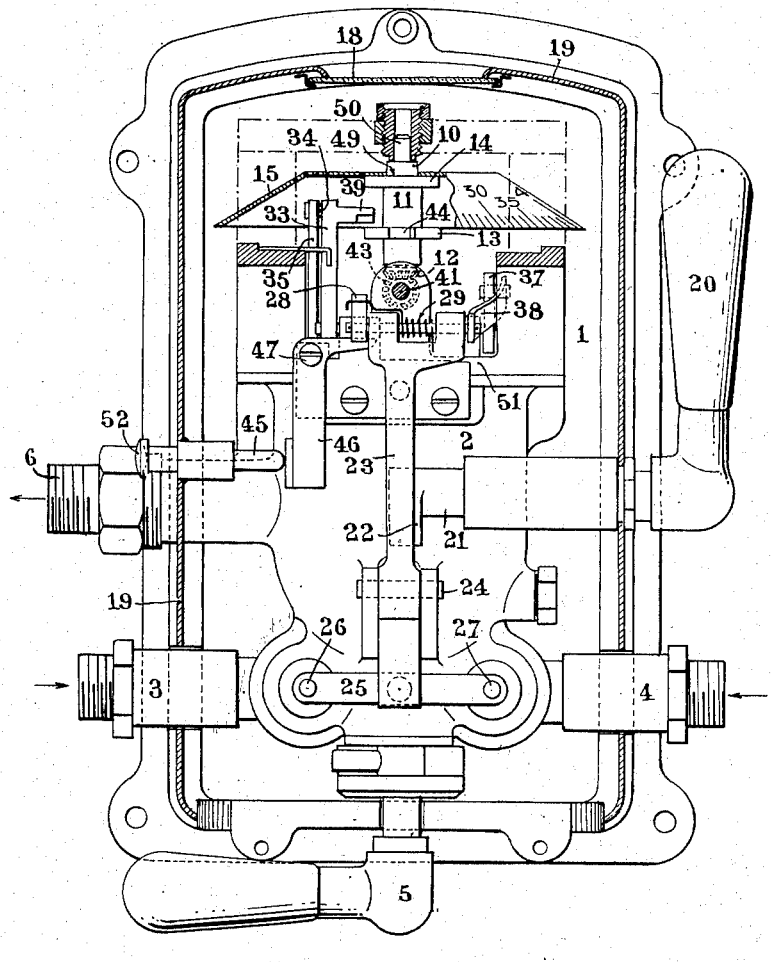
Figure 1 is a front, part-sectional, part-elevational view of the apparatus.

The metering apparatus illustrated in the drawings comprises a supporting plate 1 normally adapted to be disposed vertically and having secured thereon a water-meter 2 having hot-water and cold-water inlets 3, 4 respectively, a mixer device 5 and an outlet 6 for delivering the hot-water and cold-water mixture at the desired temperature.

The shaft 7 of the meter is adapted to drive through a pair of pinions 8, 9 a tubular shaft 10 parallel thereto which has mounted thereon another tubular member 11 carrying a bevel pinion 12, a disc 13 and a flange 14 driving in turn an annulus 15 on which a graduated scale is formed and movable in front of a fixed pointer 16 carried by a bracket 17 and visible through a glass panel 18 provided for this purpose behind an aperture in the housing 19 of the apparatus; a coil spring 48 urges the head 11 against the shoulder 49 of the tubular shaft 10, thereby causing same to rotate, due to the frictional engagement thus produced therebetween; the other tubular member 11 is mounted for free rotation on a shaft 50 journalled in bearings of which the lower one is fitted in the water-meter cover 51 and the upper one in the aforesaid bracket 17.

A handle 20 projecting laterally from the apparatus housing is provided for controlling the rotation of a shaft 21 carrying a cam 22 adapted to actuate a lever 23 fulcrumed about a pin 24 and having a lower arm engaging a cross bar 25 secured on the outer ends of the pair of valves 26, 27 controlling the cold-water and hot-water inlets respectively.

A catch 28 is pivoted on the upper end of the upper arm of lever 23 and constantly urged by a spring 29 to the position in which it bears on either the transverse pin 30 or the transverse member 31; in this latter position, as illustrated in Fig. 5, the upper edge 53 of the cut-off corner 54 is positioned at a level very slightly above that of the axis of the transverse pin 30.

This transverse pin 30 has a diametral flat portion 32 which normally lies in a vertical plane; the pin 30 is held in this position by an arm 33 held in turn in its uppermost position on the one hand by a pin 34 fixed on another arm 35 rigid with a pin 36 keyed on a segment-shaped lever 37, and on the other hand by a link 38 pivotally attached to the lever 23 and segment 37, under the control of the springs 55 seating the valves 26 and 27.

Under these conditions the shoe 39 rigid with the arm 33 is positioned at a level below that of disc 13.

To obtain an output of hot-water and cold-water mixture having the desired preadjusted proportion controlled by the mixer 5, the operator rotates the handle 20 so as to cause the shaft 21 and cam 22 to pivot in turn and drive the lever 23 to compress the springs of valves 26 and 27, thereby opening the hot-water and cold-water inlets 3 and 4.

Figure 2:
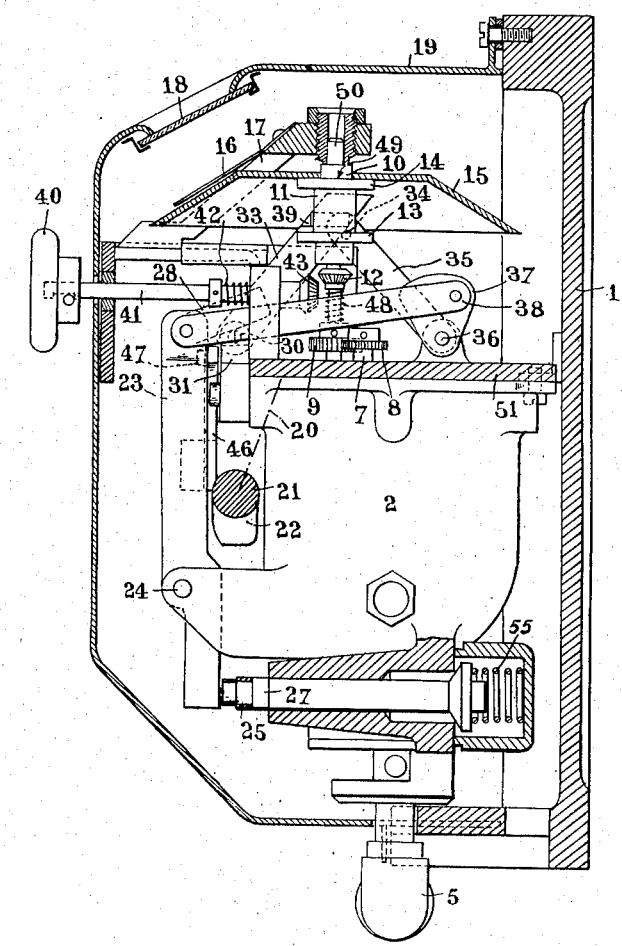
Figure 2 is a lateral, part-sectional, part-elevational view of the apparatus, all the parts being shown in their inoperative position.

Thus, the different component elements of the mechanism are moved from the positions illustrated in Fig. 2 to those illustrated in Fig. 3; in other words, after the lever 23 has pivoted the link 38 rotates the segment 37, shaft 36 and arm 35 so that the pin 34 of this arm 35 will no more retain the arm 33 in its upper position; then, this function is ensured by the shoe 39 which bears on the disc 13, and the catch 28 is held by the flat portion 32 of shaft 30, as illustrated in Fig. 5.

However, the operator has brought beforehand into meshing engagement the bevel pinion 43 with the corresponding bevel pinion 12 by pressing and rotating a control knob 40 projecting from the apparatus housing 19 on a rod 41 so as to bring the desired graduation line of the annular member 15 in front of the pointer 16.

The meter 2 will then become operative and drive through the gearing 8, 9 the tubular shaft 10 and head 11; the disc 13 rigid therewith is formed with a notch 44 adapted to disengage the shoe 39 for a given angular position of the disc 13.

When the predetermined quantity of water having flown through the orifice 6 has been metered by the water meter 2, this disc 13 will release through its notch 44 the shoe 39 of which the arm 33 is dropped under the thrust produced by the end 53 of the cut-off corner 54 above the axis of shaft 30 which pivots to the angular position in which it is shown in Fig. 6; the catch 28 is released and therefore frees the lever 23 which is quickly moved in the direction of the arrow F to the position shown in Fig. 2 by the springs controlling the valves 26 and 27; the link 38, segment 37, pin 36, arm 35 and pin 34 will immediately restore the arm 33, shaft 30 and the flat portion 32 thereof to the operative positions in which they are illustrated in Figs. 2 and 5; thus, if desired, the apparatus may be reset or re-cocked after having indicated by means of the graduated annular member 15 the fresh quantity of liquid which it is desired to use thereafter.

A complementary device is provided so that the operation of the apparatus may be discontinued when desired; it consists of a push-button 52 constantly urged outwards by a spring (not shown); a pin 45 rigid with this push-button is adapted to cause a bell-crank lever 46 to rotate about a pin 47 and act directly upon the catch 28 to remove same from its position of engagement with the flat portion 32 of shaft 30; the lever 23 is thus released immediately, and the springs of valves 26, 27 will seat the latter; the delivery of water is discontinued; then, the apparatus may be reset or re-cocked by acting upon the handle 20 to permit the delivery of the remaining quantity of the pre-adjusted quantity of liquid.

Of course, the form of embodiment of the apparatus which has been described hereinabove and illustrated in the attached drawings should not be construed as limiting the invention as many modifications may be brought thereto without departing from the spirit and scope of the invention as set forth in the appended claims.

What I claim is:

1. A liquid metering apparatus intended more particularly for wetting flour during a bread-making process, which comprises a valve adapted to stop the flow of liquid to be metered, a spring urging said valve to its seated position, a meter for counting the quantity of liquid flowing beyond said valve, a lever adapted to compress said valve spring in its open position, a transverse pin having a flat portion, a catch fulcrumed on said lever and holding said lever in its operative position when the free end of said catch engages said flat portion of said transverse pin, an arm rotating bodily with the transverse pin, a shoe carried by the free end of said arm, a disc, means for rotatably driving said disc from said meter as a function of the liquid output, said flat portion of said transverse pin being disposed vertically when said shoe bears on said disc, a notch formed in said disc to enable said shoe to be released when said disc has attained a predetermined angular position, so that said transverse pin will pivot and said catch will free said lever, whereby said lever will no more hold said valve in its operative position, and means for setting said disc in a predetermined initial angular position before starting the operation of said meter.

2. A metering apparatus according to claim 1, wherein the free end of said catch engaging the flat portion of said transverse pin contacts the latter at a point situated at a level slightly above the axis of the aforesaid transverse pin.

3. A metering apparatus according to claim 1, comprising a graduated scale rotatably rigid with said disc, a fixed pointer in front of which said graduated scale is adapted to rotate, a meter housing, and an aperture in said housing in front of said graduated scale and pointer.

4. A metering apparatus according to claim 1, comprising another pivoting arm, which is engaged beneath said first pivoting arm and adapted to raise it so that the shoe carried by its free end will be positioned at a level higher than that of said disc, a pin rigid with said other pivoting arm, a segment shaped lever rigid with said pin and controlling the rotation of said other arm, a link connecting the valve-spring control lever to said segment shape lever, said other arm being in an inoperative, retracted position when said valve spring is compressed, and lifting said first arm when said valve spring is released to seat the relevant valve.

References Cited in the file of this patent

UNITED STATES PATENTS

| 1,128,060 | Schorik et al. | Feb. 9, 1915 |
| 2,046,304 | Brubaker et al. | June 30, 1936 |
| 2,265,325 | Steen | Dec. 9, 1941 |
| 2,647,659 | Berck | Aug. 4, 1953 |